(12) United States Patent
Komaji et al.

(10) Patent No.: US 9,211,784 B2
(45) Date of Patent: Dec. 15, 2015

(54) LOCK DEVICE OF ROOF MEMBER OF OPEN CAR

(71) Applicant: MAZDA MOTOR CORPORATION, Hiroshima (JP)

(72) Inventors: Tomohiro Komaji, Higashihiroshima (JP); Kouichi Matsumoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/568,894

(22) Filed: Dec. 12, 2014

(65) Prior Publication Data

US 2015/0197142 A1     Jul. 16, 2015

(30) Foreign Application Priority Data

Jan. 16, 2014   (JP) .................................. 2014-005573

(51) Int. Cl.
*B60J 7/185*       (2006.01)
*B60R 13/02*      (2006.01)

(52) U.S. Cl.
CPC ........... *B60J 7/1855* (2013.01); *B60R 13/0237* (2013.01)

(58) Field of Classification Search
CPC .......................... B60J 7/1885; B60R 13/0237
USPC .................................. 296/124, 128, 131, 132
See application file for complete search history.

(56) References Cited

U.S. PATENT DOCUMENTS 6,832,807 B2 *   12/2004   Tezuka .......................... 296/128
7,780,218 B2 *   8/2010    Habacker ................. 296/107.17

FOREIGN PATENT DOCUMENTS

JP              2006-232146 A          9/2006

\* cited by examiner

*Primary Examiner* — Dennis H Pedder
(74) *Attorney, Agent, or Firm* — Studebaker & Brackett PC

(57) ABSTRACT

A slide member to lock a roof member stored in a storage space by its rearward sliding and unlock the roof member by its forward sliding is provided. An operational member to rotate around a first rotational axis includes an operational portion to be operated from an inside of a vehicle compartment. A slide member slides longitudinally when a middle member rotates around a second rotational axis. The middle member is linked with the operational member such that it rotates in an opposite direction to a rotational direction of the operational member. The second rotational axis is located at a lower level than the first rotational axis such that the slide member slides forward to an unlock position when the middle member rotates according to an upward rotation of the operational portion.

15 Claims, 4 Drawing Sheets

LOCK DEVICE OF ROOF MEMBER OF OPEN CAR

BACKGROUND OF THE INVENTION

The present invention relates to a lock device of a roof member of an open car.

An open car, one type of vehicle, generally comprises an open/close type of roof member which is comprised of a folding top, for example, in which an open state of the roof member stored in a storage space rearward of a vehicle compartment for opening the vehicle compartment or a close state of the roof member covering over the vehicle compartment are selectable.

Herein, a lock device is provided to surely maintain a storage state of the roof member stored in the storage space as disclosed in Japanese Patent Laid-Open Publication No. 2006-232146. This lock device comprises a slide member capable of sliding longitudinally and an operational member which is configured to operationally rotate and linked with the slide member. More specifically, the slide member takes a lock position or an unlock position. In the lock position, the slide member is located at a rear position to engage with an engagement portion of the roof member in the storage state. Meanwhile, in the unlock position, the slide member is located at a front position to release its engagement with the engagement portion of the roof member. The operational member is linked with the slide member such that the slide member slides forward to the unlock position when an operational portion of the operational member which is formed forward of a rotational axis of the operational member is operated (rotated) upward. The above-described linkage in which the upward operation (rotation) of the operational member (the operational portion) is associated as an unlock state may be preferable in operating with a hand because a movement of the hand for operating (rotating) the operational member smoothly changes to another move of the hand for gaining access to the roof member.

Meanwhile, the above-described slide member and operational member are covered with a trim member almost entirely from above so that a good exterior appearance can be ensured. And the arrangement level (height) of the trim member is desired to be as low as possible in order to facilitate a rearward access from a vehicle-compartment side.

Herein, the above-descried rotational axis of the operational member needs to be located at a higher level than the slide member so that the slide member can slide forward properly with the upward operation (rotation) of the operational portion formed forward of the rotational axis. Therefore, the trim member has a limit in its lower-level arrangement.

SUMMARY OF THE INVENTION

The present invention has been devised in view of the above-described matters, and an object of the present invention is to provide a lock device of a roof member of an open car which can locate the rotational axis of the operational member at a properly low level so that the rearward access from the vehicle-compartment side can be facilitated.

According to the present invention, there is provided a lock device of a roof member of an open car which is operative to lock an open/close type of roof member stored in a storage space rearward of a vehicle compartment, comprising a slide member capable of sliding longitudinally, the slide member being configured to lock the roof member by rearward sliding thereof and unlock the roof member by forward sliding thereof, an operational member including an operational portion to be operated from an inside of the vehicle compartment and a first rotational axis provided rearward of the operational portion, the operational member being configured to rotate upward around the first rotational axis, and a middle member capable of rotating around a second rotational axis, the middle member being configured to slide the slide member longitudinally by rotating thereof, wherein the middle member is linked with the operational member such that the middle member rotates in an opposite direction to a rotational direction of the operational member, and the second rotational axis of the middle member is located at a lower level than the first rotational axis of the operational member such that the slide member slides forward to a roof-member unlock position thereof when the middle member rotates through linkage with the operational member rotating upward.

According to the above-described lock device of the roof member of the open car, since the middle member rotating in the opposite direction to the rotational direction of the operational member is located at the lower level such that the slide member slides forward to the roof-member unlock position when the middle member rotates through linkage with the operational member rotating upward, the first rotational axis which is the rotational axis of the operational member can be located at a properly low level.

According to an embodiment of the present invention, the second rotational axis of the middle member is located at a lower level than the slide member. In this case, the second rotational axis is located at a sufficiently low level, so that the first rotational axis can be located at a more-properly low level.

According to another embodiment of the present invention, the first rotational axis of the operational member is located at a lower level than an upper end of the operational member. This is preferable in setting the position of the locating the first rotational axis at the lower level.

According to another embodiment of the present invention, the middle member comprises an engaging projection portion to apply a longitudinal external force to the slide member, and the engaging projection portion is configured to engage with the slide member from below. In this case, the arrangement level (height) of the middle member can be as low as possible, so that the operational member (the first rotational axis) can be set at the properly low level.

According to another embodiment of the present invention, linkage of the operational member and the middle member is performed by means of a first gear portion which is formed at the operational member and has a rotational center thereof on the first rotational axis and a second gear portion which is formed at the middle member, has a rotational center thereof on the second rotational axis, and is configured to engage with the first gear portion. In this case, the operational member and the middle member can be rotated in the opposite directions to each other simply and surely by using the respective gear portions of the operational member and the middle member.

According to another embodiment of the present invention, the operational member and the middle member are linked with each other such that an operational force of the operational member is multiplied and the multiplied operational force is transmitted to the middle member. In this case, an operational force necessary for unlocking can be properly small.

According to another embodiment of the present invention, a distance between the operational portion and the first rotational axis of the operational member is set to be longer than a distance between the operational portion of the operational member and the second rotational axis of the middle member.

In this case, the operational force transmitted to the middle member can be multiplied to make the operational force necessary for unlocking properly small.

According to another embodiment of the present invention, the operational member, the slide member, and the middle member are supported at a support bracket fixed to a vehicle body. In this case, the operational member, the middle member, and the slide member can be assembled to the vehicle body by merely attaching the support bracket to the vehicle body.

According to another embodiment of the present invention, between the storage space of the roof member and the vehicle compartment is provided a trim member which extends longitudinally substantially horizontally and covers over a rear end portion of the operational member, a front end portion of the slide member, and the middle member. In this case, an exterior appearance can be improved by covering the lock device almost entirely with the trim member. Of course, this is preferable in locating the trim member at a properly low level so that the rearward access from the vehicle-compartment side can be easier because the arrangement level of the operational member can be properly low.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
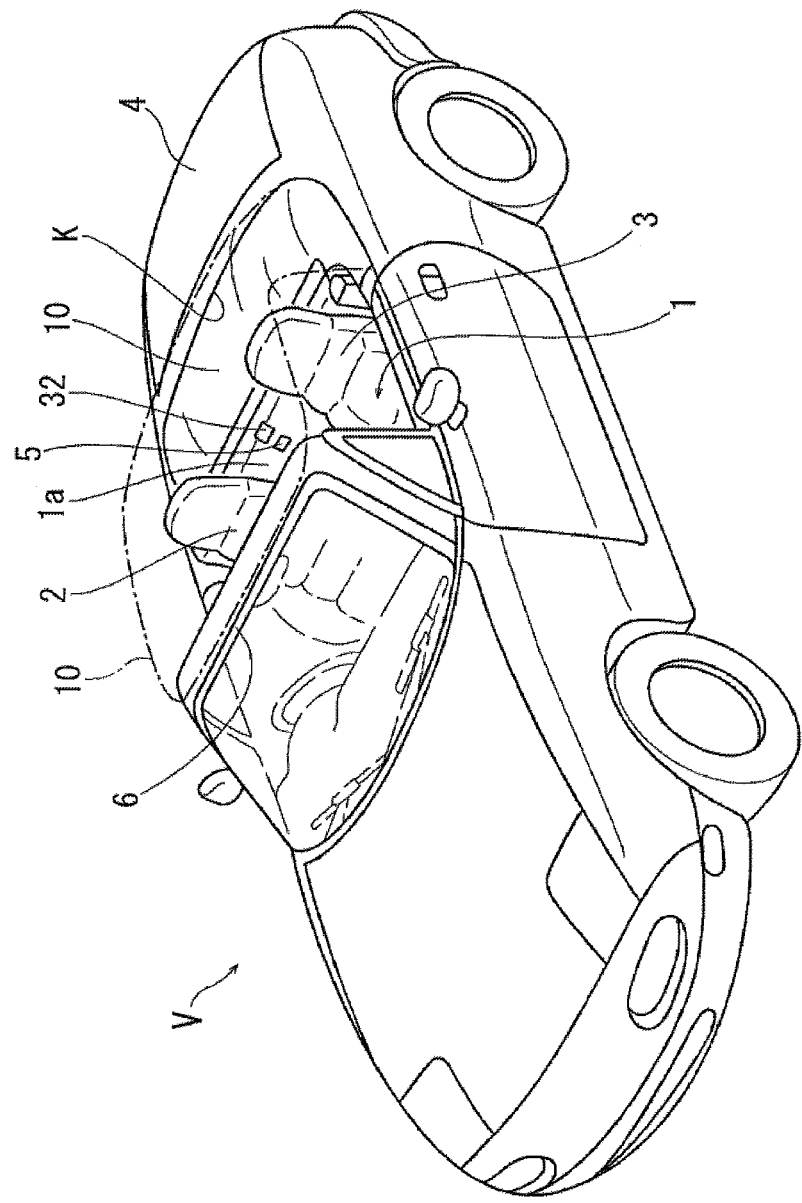
FIG. 1 is a perspective view showing an example of an open car to which the present invention is applied.

In FIG. 1, an open car V as an exemplified vehicle is a two-seat type of vehicle, which has a driver's seat 2 and a passenger (assistant) seat 3 in a vehicle compartment 1. A storage space K is formed just rearward of a rear wall 1a of the vehicle compartment 1, and a trunk room which is opened or closed with a trunk lid 4 is constituted rearward of the storage space K.

In FIG. 1, a reference character 10 denotes an open/close type of roof member. The roof member 10 of the embodiment is a folding-top type of roof member in which a folding-top material (water-proof sheet material) is stretched on a frame of the roof member. The roof member 10 is configured to be stored in the storage space K when being folded. The roof member 10 stored in the storage space K is illustrated by solid lines, and the roof member 10 covering over the vehicle compartment in a close state (a use state) is illustrated by one-dotted broken lines.

The roof member 10 stored in the storage space K is configured to be locked by a lock device R. Hereafter, the lock device R will be described, but a surrounding structure of the lock device R will be described referring to FIG. 4, first.

A glove compartment (space) G is formed at a high position of the rear wall 1a of the vehicle compartment 1, and an open-close operational portion is denoted by a reference character 5 in FIG. 1. A cross member 75 which is a strength member extending in a vehicle width direction is arranged just rearward of an upper end portion of the glove compartment G.

A trim member 70 is arranged rearward of the cross member 75. The trim member 70 comprises an upper face portion 70a which extends longitudinally substantially horizontally and covers above the cross member 75 and a vertical face portion 70b which extends downward from a rear end of the upper face portion 70a and is positioned just rearward of the cross member 75. The vertical face portion 70b constitutes a front face of the storage space K.

The lock device R is arranged in a vertical space above the cross member 75 and between the cross member 75 and the upper face portion 70a of the trim member 70.

Figure 2:
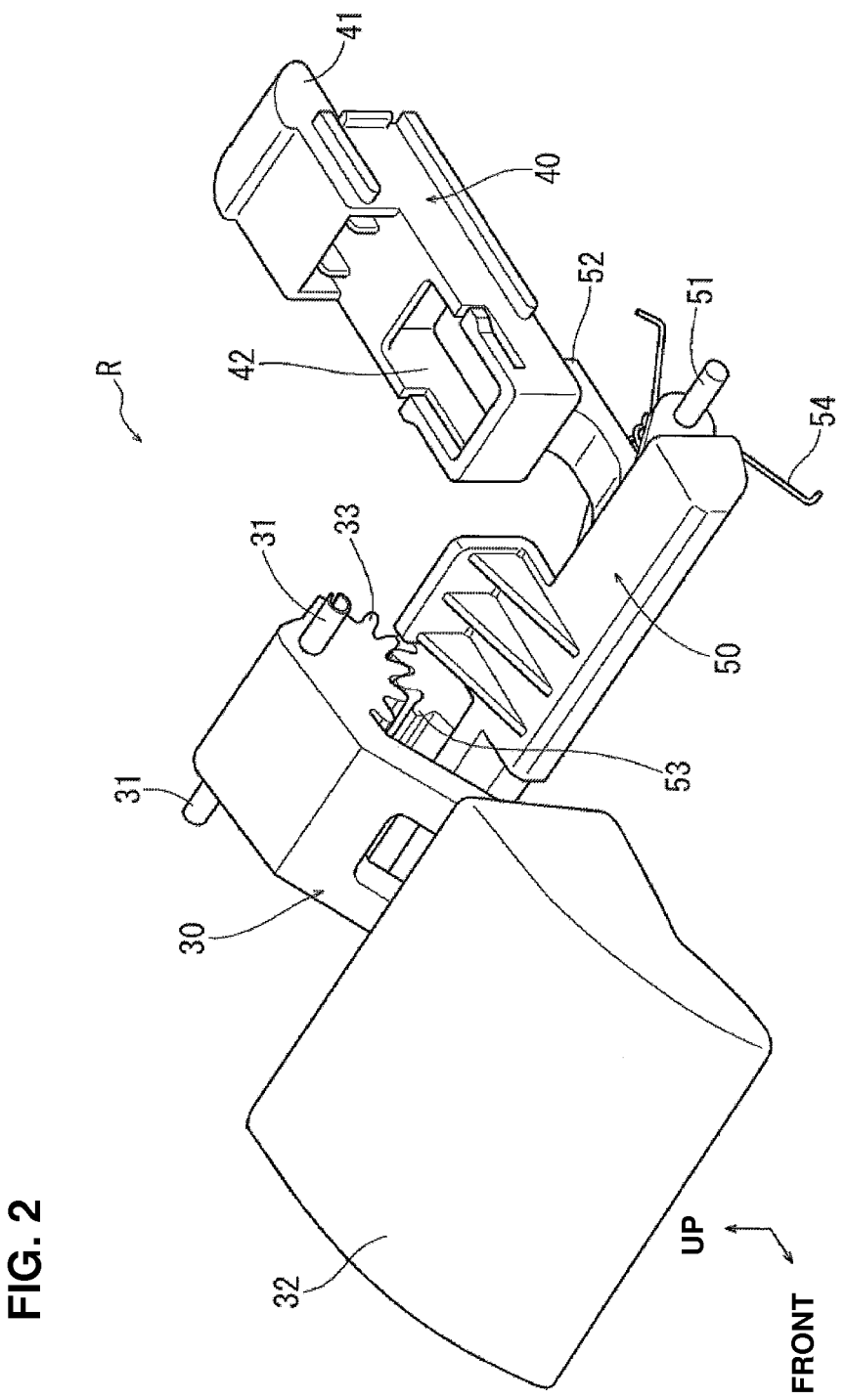
FIG. 2 is a perspective view of a lock device.
Figure 3:
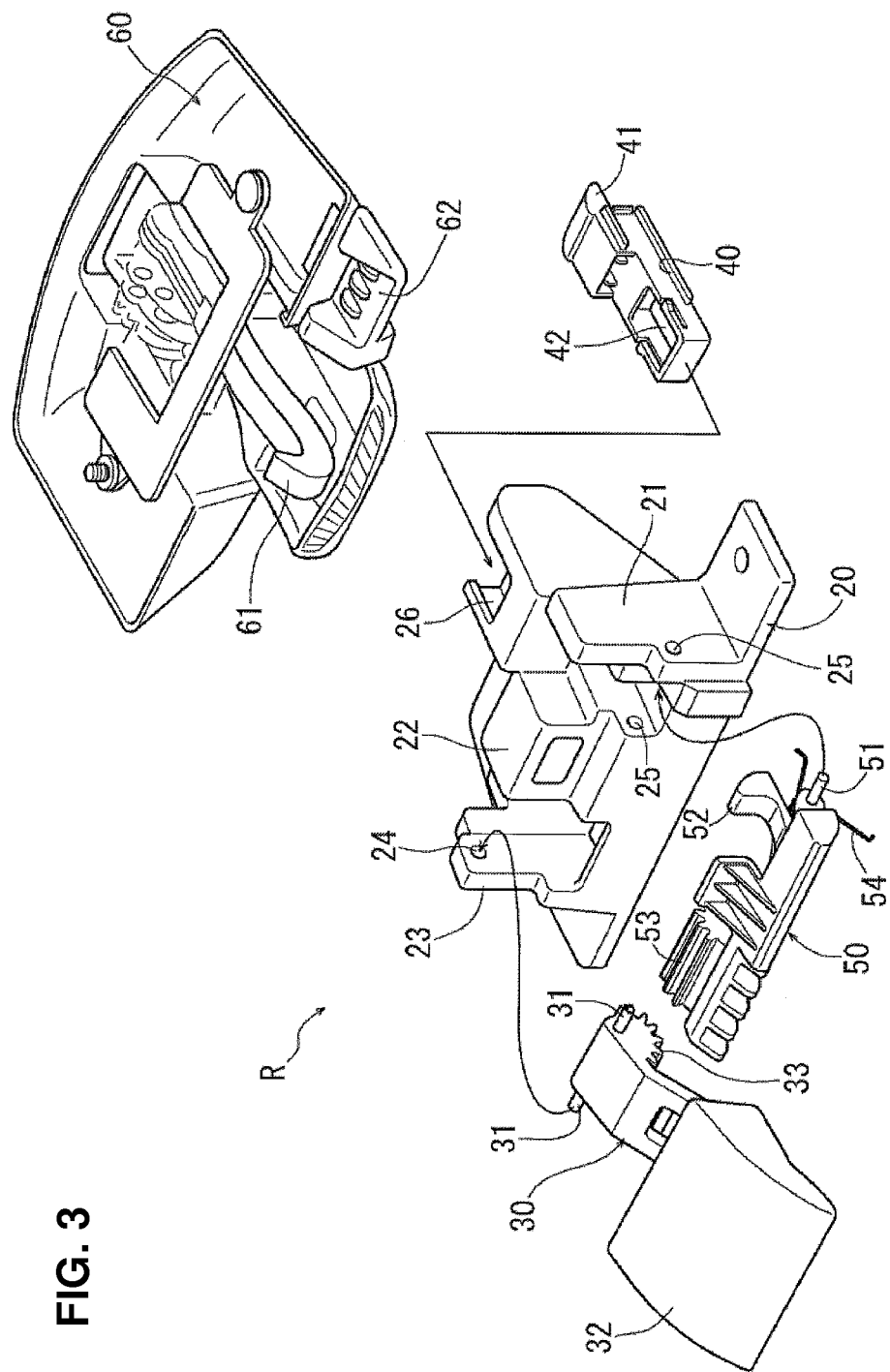
FIG. 3 is an exploded perspective view showing the lock device shown in FIG. 2 together with a support bracket and a member provided on a roof-member side.

The lock device R comprises an operational member 30, a slide member 40, and a middle member 50 as shown in FIGS. 2 and 3. The respective members 30, 40, 50 are supported at a support bracket 20 which is fixed on an upper face of the cross member 75. The support bracket 20 comprises three projection portions 21, 22, 23 which project upward and are spaced apart from each other in the vehicle width direction.

The operational member 30 is formed in an arm shape extending longitudinally and has a pair of right-and-left pins 31 which extend in the vehicle width direction at its rear end portion. These pins 31 are rotatably connected to respective support holes 24 which are formed at the projection portions 22, 23 of the support bracket 20 (the one 24 formed at the projection portion 22 is not illustrated in FIG. 3). A front end portion of the operational member 30 is constituted as an operational portion 32 which is to be operated by a driver's hand with its finger from the inside of the vehicle-compartment. An upper end of the operational portion 32 is flatly continuous from the upper face portion 70a of the trim member 70. The operational member 30 is configured to rotate clockwise around the pins 31 as a first rotational axis in FIG. 4 by operationally rotating the operational portion 32 upward.

The slide member 40 is supported in a support hole 26 of the support bracket 20 so as to slide longitudinally. The slide member 40 is configured to engage with or disengage from an engagement portion 62 which is formed at a bottom face of a front end portion of the roof member 10 stored in the storage space K as shown in FIG. 3. That is, a bracket 60 is fixed to the lower face of the front end portion of the roof member 10, and the engagement portion 62 is formed at the bracket 60. When the slide member 40 retreats and takes its rearward position, it is located on the engagement portion 62 of the roof member 10 stored in the storage space K to have a lock state in which the roof member 10 is restrained from rising upward. Meanwhile, when the slide member 40 slides forward, it disengages from the engagement portion 62 to have an unlock state. Herein, in FIG. 3, a reference character 61 denotes a hook member for locking which is provided at the bracket 60, which is configured to engage with a front header 6 of the vehicle V when the roof member 10 is in the use state.

The middle member 50 has pins 51, which are rotatably connected to support holes 25 formed at the respective projection portions 21, 22 of the support bracket 20. The pins 51 are configured as a second rotational axis. The middle member 50 comprises an engaging projection portion 52 which extends rearward and has an end portion bending upward. The engaging projection portion 52 is configured to be inserted into an engagement hole 42 formed at the slide member 40 from below. Thereby, when the middle member 50 is rotated counterclockwise around the pins 51 in FIG. 4, the engaging projection portion 52 comets to contact a front-end edge portion of the engagement hole 42 of the slide member 40 and thereby moves the slide member 40 forward (in an unlock direction). Meanwhile, when the middle member 50 is rotated clockwise around the pins 51 in FIG. 4, the engaging projection portion 52 comets to contact a rear-end edge portion of the engagement hole 42 of the slide member 40 and thereby moves the slide member 40 rearward (to a lock position). The middle member 50 is biased by a return spring 54 in its clockwise direction (toward the lock position).

Figure 4:
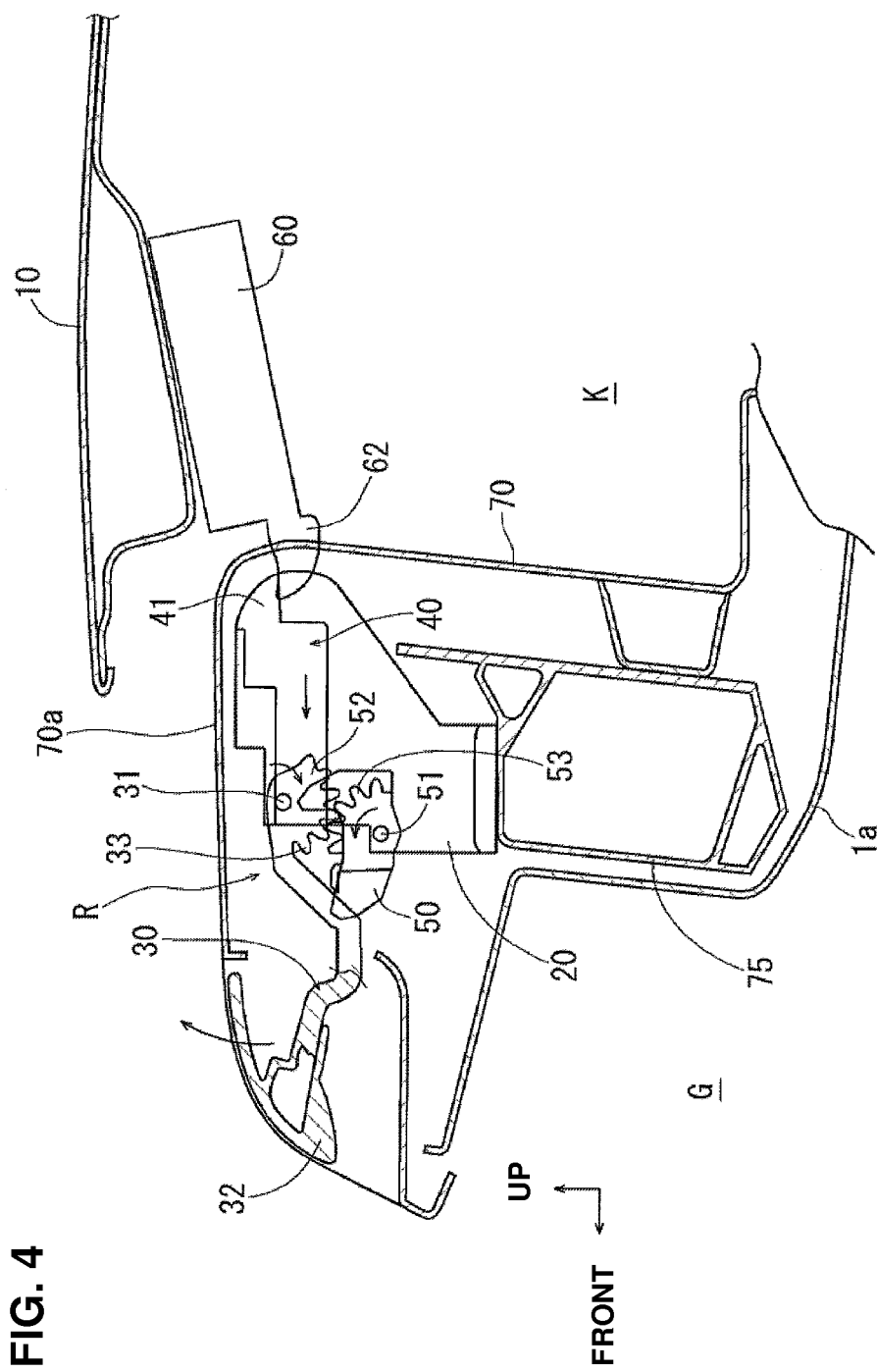
FIG. 4 is a side view of the lock device and its surrounding structure, which shows overlapping portions of the both with solid lines.

The operational member 30 and the middle member 50 are linked with each other such that the middle member 50 rotates counterclockwise in FIG. 4 when the operational portion 32 of the operational member 30 is rotationally operated upward. The operational member 30 includes a first gear portion 33 having its center located at the pins 31. Meanwhile, the operational member 30 includes a second gear portion 53 having its center located at the pins 51. The both gear portions 33, 53 are configured to engage with each other. Thereby, an upward rotation of the operational portion 32 causes an unlock-direction rotation of the middle member 50 by means of the gear portions 33, 53. Herein, the first gear portion 33 is formed substantially at a half-circular peripheral area located below the pins 31, and the second gear portion 53 is formed substantially at a half-circular peripheral area located above the pins 53.

The pins 31 as the rotational axis of the operational member 30 are located at a considerably low level, and especially in the embodiment, this pin-location level is set to be lower than an upper end of the operational portion 32 and also the lowest portion of the slide member 40. The pins 51 as the rotational axis of the middle member 50 are located at a lower level than the pins 31 of the operational member 30 and also the slide member 40.

The distance between the operational portion 32 and the pins 31 is set to be greater than that between the operational portion 32 and the pins 51. Thereby, an upward operational force of the operational portion 32 is multiplied and transmitted to the middle member 50 (the operational-force reduction function of the operational portion 32). Herein, the locking or unlocking can be performed with a smaller movement of the operational portion 32 by setting the above-described distance relation inversely.

The diameter of the gear portion 33 is set to be equal to that of the gear portion 53, so that no force multiplication is performed in this portion. However, the force multiplication can be performed with using the gear portions 33, 53 by setting the diameter of the gear portion 33 to be smaller than that of the gear portion 53. Herein, the locking or unlocking can be performed with the smaller movement of the operational portion 32 by setting the above-described diameter relation inversely.

Herein, while it is configured such that the slide member 40 is located rearward at the lock position when the roof member 10 is in the close state, an upper face of the rear end portion of the slide member 40 and a lower face of the engagement portion 62 are configured as a slant face (constituting a cam face) so that the engagement portion 62 can push the slide member 40 forward against the return spring 54 according to the lowering movement of the roof member 10 stored in the storage space K. The slide member 40 is made to engage with the engagement portion 62 (ensuring the lock state) by the return spring 54 in a state in which the engagement portion 62 is located below the slide member 40.

Herein, the upper face portion 70a of the trim member 70 covers the rear end portion of the operational member 30 (the portion except the operational portion 32), the middle portion 50, and the front end portion of the slide member 40 (the portion except the engaging portion with the engagement portion 62) from above. Since the pins 31 as the rotational axis of the operational member 30 located upward is positioned at the sufficiently low level, the level (height) of the upper face portion 70 can be sufficiently low as well. Thereby, a rearward access from the side of the vehicle compartment 1 over the upper face portion 70a (particularly, gaining access to the roof member 10 in the storage state) can be facilitated.

The operational member 30, the slide member 40, and the middle member 50 are assembled to a specified position of the vehicle body by fixing the support bracket 20 to the cross member 75 in a state in which these members 30, 40, 50 have been previously attached to the support bracket 20.

While the embodiment has been described, the present invention should not be limited to the above-described embodiment, and any other modifications or improvements may be applied within the scope of a sprit of the present invention. The roof member 10 is not limited to the folding-top type, but any hard-top type which is made from fiber reinforced plastic, for example, can be applied.

What is claimed is:

1. A lock device of a roof member of an open car which is operative to lock an open/close type of roof member stored in a storage space rearward of a vehicle compartment, comprising:

a slide member capable of sliding longitudinally, the slide member being configured to lock the roof member by rearward sliding thereof and unlock the roof member by forward sliding thereof;

an operational member including an operational portion to be operated from an inside of the vehicle compartment and a first rotational axis provided rearward of the operational portion, the operational member being configured to rotate upward around the first rotational axis; and a middle member capable of rotating around a second rotational axis, the middle member being configured to slide the slide member longitudinally by rotating thereof, wherein said middle member is linked with said operational member such that the middle member rotates in an opposite direction to a rotational direction of the operational member, and said second rotational axis of the middle member is located at a lower level than said first rotational axis of the operational member such that the slide member slides forward to a roof-member unlock position thereof when the middle member rotates through linkage with the operational member rotating upward.

2. The lock device of the roof member of the open car of claim 1, wherein said second rotational axis of the middle member is located at a lower level than said slide member.

3. The lock device of the roof member of the open car of claim 2, wherein said first rotational axis of the operational member is located at a lower level than an upper end of the operational member.

4. The lock device of the roof member of the open car of claim 1, wherein said middle member comprises an engaging projection portion to apply a longitudinal external force to said slide member, and said engaging projection portion is configured to engage with the slide member from below.

5. The lock device of the roof member of the open car of claim 1, wherein linkage of said operational member and said middle member is performed by means of a first gear portion which is formed at the operational member and has a rotational center thereof on said first rotational axis and a second gear portion which is formed at the middle member, has a rotational center thereof on said second rotational axis, and is configured to engage with said first gear portion.

6. The lock device of the roof member of the open car of claim 1, wherein said operational member and said middle member are linked with each other such that an operational force of the operational member is multiplied and the multiplied operational force is transmitted to the middle member.

7. The lock device of the roof member of the open car of claim 1, wherein a distance between said operational portion and said first rotational axis of the operational member is set to be longer than a distance between the operational portion of the operational member and said second rotational axis of the middle member.

8. The lock device of the roof member of the open car of claim 1, wherein said operational member, said slide member, and said middle member are supported at a support bracket fixed to a vehicle body.

9. The lock device of the roof member of the open car of claim 1, wherein between said storage space of the roof member and the vehicle compartment is provided a trim member which extends longitudinally substantially horizontally and covers over a rear end portion of said operational member, a front end portion of said slide member, and said middle member.

10. The lock device of the roof member of the open car of claim 3, wherein linkage of said operational member and said middle member is performed by means of a first gear portion which is formed at the operational member and has a rotational center thereof on said first rotational axis and a second gear portion which is formed at the middle member, has a rotational center thereof on said second rotational axis, and is configured to engage with said first gear portion.

11. The lock device of the roof member of the open car of claim 10, wherein said middle member comprises an engaging projection portion to apply a longitudinal external force to said slide member, and said engaging projection portion is configured to engage with the slide member from below.

12. The lock device of the roof member of the open car of claim 10, wherein said operational member and said middle member are linked with each other such that an operational force of the operational member is multiplied and the multiplied operational force is transmitted to the middle member.

13. The lock device of the roof member of the open car of claim 10, wherein a distance between said operational portion and said first rotational axis of the operational member is set to be longer than a distance between the operational portion of the operational member and said second rotational axis of the middle member.

14. The lock device of the roof member of the open car of claim 10, wherein said operational member, said slide member, and said middle member are supported at a support bracket fixed to a vehicle body.

15. The lock device of the roof member of the open car of claim 10, wherein between said storage space of the roof member and the vehicle compartment is provided a trim member which extends longitudinally substantially horizontally and covers over a rear end portion of said operational member, a front end portion of said slide member, and said middle member.

* * * * *